United States Patent
Eriksson et al.

(10) Patent No.: US 8,062,179 B2
(45) Date of Patent: Nov. 22, 2011

(54) METHOD FOR EXITING AN ENGINE-IDLE DRIVING MODE IN A HEAVY LAND VEHICLE

(75) Inventors: Anders Eriksson, Torslanda (SE); Sixten Berglund, Torslanda (SE)

(73) Assignee: Volvo Lastvagnar AB, Göteborg (SE)

( * ) Notice: Subject to any disclaimer, the term of this patent is extended or adjusted under 35 U.S.C. 154(b) by 929 days.

(21) Appl. No.: 12/065,010

(22) PCT Filed: May 22, 2006

(86) PCT No.: PCT/SE2006/000600
§ 371 (c)(1),
(2), (4) Date: Feb. 27, 2008

(87) PCT Pub. No.: WO2007/030045
PCT Pub. Date: Mar. 15, 2007

(65) Prior Publication Data
US 2008/0300105 A1 Dec. 4, 2008

Related U.S. Application Data

(60) Provisional application No. 60/596,185, filed on Sep. 7, 2005.

(51) Int. Cl.
*B60W 10/04* (2006.01)
*B60W 10/10* (2006.01)
(52) U.S. Cl. .................................. 477/107; 477/111
(58) Field of Classification Search .............. 477/107, 477/111
See application file for complete search history.

(56) References Cited

U.S. PATENT DOCUMENTS

| 5,863,277 | A | 1/1999 | Melbourne |
| 2005/0143877 | A1* | 6/2005 | Cikanek et al. ................. 701/22 |
| 2005/0221950 | A1 | 10/2005 | Eriksson et al. |
| 2006/0063642 | A1* | 3/2006 | Hawkins ...................... 477/107 |

FOREIGN PATENT DOCUMENTS

| JP | 63199952 A | 8/1988 |
| JP | 2277944 A | 11/1990 |

OTHER PUBLICATIONS

International Search Report for corresponding International Application PCT/SE2006/000600, Aug. 29, 2006.

* cited by examiner

*Primary Examiner* — Sherry Estremsky
(74) *Attorney, Agent, or Firm* — WRB-IP LLP

(57) ABSTRACT

Method for exiting an engine-idle driving mode in a heavy land vehicle having an automatic transmission. The engine-idle driving mode is established in the vehicle when the engine is running substantially constantly at idle speed and a gear is engaged propelling the vehicle at a corresponding substantially constant, relatively slow vehicle speed. The method includes receiving a driver request, when in engine-idle driving mode, to accelerate from the prevailing substantially constant, relatively slow vehicle speed. The engine torque requirement is assessed for delivering the requested acceleration that can be developed from the engine while maintaining the automatic transmission in the same gear in which engine-idle driving is taking place. The requested acceleration is delivered by increasing the engine's torque output and without downshifting the automatic transmission.

17 Claims, 2 Drawing Sheets

METHOD FOR EXITING AN ENGINE-IDLE DRIVING MODE IN A HEAVY LAND VEHICLE

The present application is a non-provisional application corresponding to International Application No. PCT/SE2006/000600, filed May 22, 2006, which claims priority to U.S. Provisional Application 60/596,185, filed Sep. 7, 2005.

FIELD OF THE INVENTION

The present invention relates to commercial vehicles; and more particularly to drivetrain control strategies for such vehicles as heavy trucks, buses and the like.

BACKGROUND AND SUMMARY

In the course of driving heavy vehicles such as overland trucks and buses (which should be considered interchangeable for purposes of the description contained herein), it is common to be required to drive at relatively slow speeds, often for extended periods of time. Exemplary situations are driving in slow, backed up traffic and maneuvering about loading yards where high-speed travel is not possible. In modern heavy vehicles, it is common to find that such vehicles are equipped with an automatic mechanical transmission (AMT) or an automatic transmission. In either case, computer control strategies are utilized in the selection of gear engagements, as well as transition strategies between the different gear choices of the transmission.

Referring to the situations in which it is desired that the heavy vehicle move slowly but substantially constantly on course, operators have developed habits for engaging an appropriate low gear which carries the vehicle forward or backward under the power of the idling engine. Depending upon the desired speed and the heavy vehicle load, among other factors, different low gears are selectable.

The low gears available for selection, however, are limited by the torque that can be developed in each gear by the engine operating at the preset idle speed, and the range of gears available for use at any particular time will be determined by conditions of the vehicle, as well as conditions of the environment within which the vehicle is operating. The two primary conditions upon which the range of available gears is dependent is the mass of the vehicle (including any load) and ground inclination, and each of these two aspects bear on the vehicle's resistance to travel, as does wind/air resistance. Dependent at least in part on each of the two characteristics of vehicle mass and ground inclination, the highest gear of the transmission can be determined at which the idling engine can maintain a substantially constant speed of the vehicle without losing speed because of insufficient torque capability. Heretofore, operators have been left to draw on their experience for selecting an initial gear for establishing such engine idle-driving mode, with adjustments being made up or down in order to engage the gear which produces the desired travel speed, and which is also capable of maintaining that speed using the torque developed at the preset idle speed of the engine, for example, 650 revolutions per minute, give or take a few hundred revolutions, depending on the particular engine.

It is appreciated that if presently existing conditions are known which bear upon the highest gear selection at which the idling engine can maintain a constant vehicle speed, that gear can be determined, engaged and utilized for powering travel of the vehicle. Often times, however, the highest possible gear ratio carries the vehicle in the engine idle-driving mode at a groundspeed greater than desired. For instance, the traffic flow within which the heavy truck is operating maybe slower than this maximum speed which the idling engine can maintain under existing conditions. Heretofore, as described above, selection of the proper gear which permits the engine to operate at idle and produce the desired speed of the vehicle was performed by the operator himself based on past experience and trial-and-error with respect to selection within a typical low range of gears.

This type of trial-and-error, hunt-and-peck gear selection by the operator obviously has drawbacks; among others, if the truck is operating under slow speed conditions, the driver can become unnecessarily fatigued by the gear selection process. Still further, operating economy can suffer not only because of inefficiencies associated with constant gear changing and adjustments, but also if the optimal gear is not selected which can use the preset idle speed of the engine for maintaining the desired vehicle speed. Therefore, the need has been recognized for a drivetrain control system in which such gear selections are made on at least a semi-automated basis with only minimal or no direct selection input from the operator.

In at least one exemplary embodiment, the present invention takes the form of a method for exiting or leaving an engine-idle driving mode in a heavy land vehicle that has an automatic transmission. In the present context, the terminology "automatic transmission" is used to identify transmission configurations that are fully automatic (no accommodation for manual gear selection), as well as those often referred to as semi-automatic because gear selections can be operator-designated, but the transmission also has automatic gear changing features. As explained in greater detail above, the engine-idle driving mode is established in a vehicle when the engine is running substantially constantly at idle speed and a gear is engaged propelling the vehicle at a corresponding substantially constant, but relatively slow vehicle speed such as in slow-moving, heavy traffic. When engine-idle driving mode is no longer needed, such as when the driver has cleared the slow moving driving pattern, their action is to depress the accelerator to increase the vehicle's speed. According to the invention, this action is recognized (assessed) as a driver request to exit or leave engine-idle driving mode and accelerate from the prevailing substantially constant, relatively slow vehicle speed. It will be appreciated by those skilled in the art that when the vehicle is traveling at such a relatively slow rate of speed, the engine may in fact not be imparting a great deal of power to the drive wheels so engine torque production may be minimal at the time. The torque capacity of the engine, however, is much greater and is generally known, for instance, according to the engine's torque curve.

Because of the driver's desire for an increase in vehicle speed (acceleration), more torque from the engine is needed. The amount of torque needed, however, will be determined at least in part based on the increased degree by which the accelerator has been depressed. In another aspect, the increase in delivered engine torque is based on the vehicle's resistance to travel. For instance, if the vehicle is on an incline, a greater amount of torque will be needed for the requested speed change than if rolling downhill. In a related manner, the weight (mass) of the vehicle also affects the amount of engine torque to change the speed of the vehicle. Additional situations where a greater amount of torque is needed include but are not limited to situations where an additional load is placed on the engine by a power take off unit or the vehicle is on soil that slows movement. The vehicle's resistance to travel and acceleration, however, can be at least generally quantified at any given time. The quantification can take place using either individual sensors for the mass, wind resistance, and power take off load, or using the current engine torque and vehicle acceleration to determine these resistances. Using this quantification, the present invention assesses whether the engine torque requirement for delivering the requested acceleration to the increased speed can be developed from the engine while maintaining the automatic transmission in the same gear presently engaged. Assuming that it is assessed that the engine can provide the required torque without downshifting the automatic transmission, then the extra power is delivered and the requested acceleration affected. Among other benefits, this positively affects drivability of the vehicle by smoothing take-off when the driver exits engine idle-driving mode. It also saves fuel over what would be consumed in normal driving mode due to downshifting that would occur if the same driver request for increased vehicle speed were made while driving at the same relatively slow vehicle speed, but not in engine-idle driving mode.

Exemplarily, the driver request to accelerate the vehicle is assessed from the detection of a change in depression of an accelerator of the vehicle, and more specifically, an increase in depression. When leaving the engine idle-driving mode, the increase in depression of the accelerator normally begins from a non-depressed position; i.e., a foot-off-the-gas situation.

As shown in FIG. 1, another aspect of the invention is that while in the engine-idle driving mode (block 10) and a driver requests acceleration (block 20), it is assessed whether available engine torque in the current gear is sufficient to maintain the substantially constant, relatively slow vehicle speed (block 30) during times when vehicle travel resistance is fluctuating. A prime example of such a fluctuation in vehicular resistance to travel is the influence of road inclination. For instance, as a vehicle travels along an incline-changing road such as rolling hills and valleys, the resistance to forward travel commensurately changes thereby constituting fluctuations in travel resistance. Preferably, this assessment is conducted substantially continuously. The requested acceleration is delivered by increasing the engine's torque output and without downshifting the automatic transmission (block 40).

As mentioned above, one important variable that can influence a vehicle's resistance to travel is its mass or weight, and the effect of the vehicle's weight is accentuated when road inclination is simultaneously considered. Another influence is air resistance, and particularly wind resistance which has a fluctuating character based primarily on strength and direction.

One aspect of the engine idle-driving mode is that the automatic transmission is downshifted at least one gear when it is assessed that maximum available engine torque in the current gear is insufficient to maintain the substantially constant, relatively slow vehicle speed when vehicle travel resistance is considered.

BRIEF DESCRIPTION OF THE DRAWINGS

The features and advantages of the present invention are well understood by reading the following detailed description in conjunction with the drawings in which like numerals indicate similar elements and in which.

DESCRIPTION OF THE INVENTION

Figure 1:
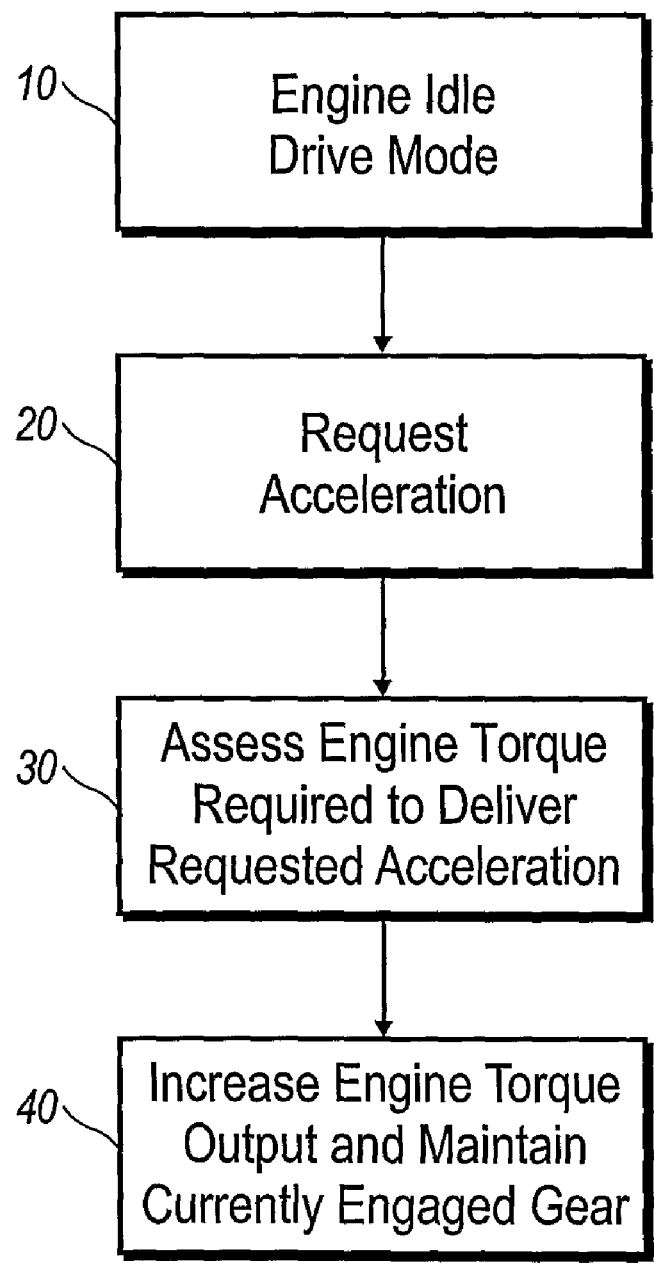
FIG. 1 is a flow chart showing a method according to an aspect of the present invention.

In commercial vehicles such as heavy trucks and buses it is common to have computer-controlled subsystems. Among others, those subsystems typically include at least the engine and transmission. With the introduction of computer-based control systems for the engine and transmission, and the capability for the exchange of information therebetween, it is now possible to automate coordination between the two subsystems for such benefits as fuel economy and acceleration, as well as driver comfort and drivability. Using such computer-based control systems, driver fatigue can be substantially reduced, as well as facilitate a less experienced operator's near expert control of the vehicle. The presently disclosed invention(s) is premised on computer implementation which automates the processes.

As described hereinabove, driving conditions often exist in which it is desirable that the vehicle be driven at a substantially constant speed, albeit, a relatively slow speed in such conditions as heavy traffic or load yard maneuvering. The need for such slow speed travel can be either forward or reverse, though the need for a greater selection of forward speeds is appreciated.

In a heavy vehicle, such as an overland truck powered by a diesel engine, a preset idle speed is typically programmed in the engine control strategy. As those persons skilled in the art will appreciate regarding a standard torque curve, the engine, at this idle speed will have a certain maximum torque capability. The idle speed of the engine can vary depending on the manufacturer and type of engine, but a typical example is an engine having an idle speed of approximately 650 revolutions per minute. Given this variability, the range of engine idle speed is within 100 revolutions per minute from 650 revolutions per minute.

Variable characteristics of the vehicle bear upon its resistance to travel, as do varying road conditions. While there are several variables within each category (vehicle versus environment) that can influence vehicle travel resistance, the two primary variables are vehicle mass and ground inclination. Both of these characteristics are presently able to be quantified in suitably equipped vehicles, and therefore these variables become known inputs for calculations and gear selections made according to the present invention. Another possible factor in vehicle travel resistance includes wind resistance. Other forces that retard the motion of the vehicle can be additional variables in the determination of the vehicle travel resistance. These additional forces giving rise to vehicle travel resistance include but are not limited to a power take off load and soft or muddy soil conditions. The assessment of these additional forces can be exemplarily performed by using engine torque and vehicle acceleration to determine the vehicle travel resistance. Other methods of determination can be used to for calculating vehicle travel resistance as well.

A typical and exemplary situation in which a driver desires to go to engine idle-driving mode is when approaching and joining a slower speed, high traffic driving pattern. When such a situation is foreseen by a driver, the initial reaction is to remove accelerator input (take their foot off the accelerator pedal) and begins to coast toward the slower traffic pattern or zone. The current invention presumes the detection of such an event (desire to slow the vehicle to a lesser, but constant travel speed), and using certain assessed or measured conditions, such as vehicle mass and road inclination, the highest gear of the transmission is selected that will carry the vehicle at the highest speed utilizing the maximum available torque producible at engine idle speed. In essence, the programmed logic assesses/measures/determines/calculates the vehicle's resistance to roll under presently existing conditions, and matches that resistance against a maximum torque capability of the idling engine using an appropriate and automatically selected gear engagement. This assessment/measurement/determination/calculation in a preferred embodiment is performed on a substantially continuous basis.

According to the prescribed routine, as the vehicle slows, this prescribed idle travel speed will be eventually reached and the vehicle will continue traveling at that speed.

Oftentimes, however, this maximum idle travel speed is greater than current traffic or site conditions permit and the driver must further slow the vehicle. Because of the frequency at which this occurs, the present invention facilitates the driver by enabling easily actuated, automated downshifts. In an exemplary embodiment, the brake pedal is used as an actuator which when depressed, and preferably in a bump-press manner, causes the transmission to downshift one or more gears. Eventually, the vehicle will be traveling at the desired rate of speed under the influence of the idling engine.

A natural and frequent occurrence is that the need for slow travel eventually ceases and the operator desires to accelerate the vehicle back to a higher travel speed. In order to do so, the accelerator is depressed, and depending upon the degree to which the pedal is depressed, normal transmission programming would cause a downshift for increased torque production at a higher engine speed. Other embodiments for requesting the vehicle to travel at a higher speed include but are not limited to a change in the pedal position and an increase in the amount that the pedal is depressed from zero depression. For certain reasons such as driver comfort and economy, it is desired that such downshifting be prohibited as the vehicle pulls out of the idle speed travel mode and the same gear engagement at which idle travel was taking place be maintained. As the vehicle gains speed, the regular driving transmission control strategies resume operation.

When in idle driving mode, an assessment of available engine torque is made, as is an assessment of driver demanded acceleration/torque. The transmission controller is programmed so that a downshift does not occur if the available engine torque is sufficient to meet the driver requested acceleration/torque. However, if the assessment indicates that driver requested torque is insufficient, then a downshift is performed to the appropriate gear. In a normal driving mode downshifting occurs in response to driver demand for increased torque acceleration. As described above this demand by the driver is detected through a change in position of the accelerator pedal.

While in engine-idle driving mode assessment of available engine torque is made to determine if the torque in the current gear is sufficient to maintain said substantially constant, relatively slow vehicle speed during times when vehicle travel resistance is fluctuating. Fluctuation of vehicle travel resistance is from change in the assessed road conditions as described above including wind resistance, road inclination, and change in mass of the vehicle.

However a downshift will be performed in engine-idle driving mode, when the vehicle travel resistance is assessed to exceed available engine torque in the current gear.

In the manner described hereinabove, computer-based transmission control facilitates easier and more efficient idle speed driving of a heavy commercial vehicle, as well as gives the operator an easy-to-use procedure for incrementally reducing idle speed travel once established, and accommodating a smooth economical return to normal road speed travel.

Figure 2:
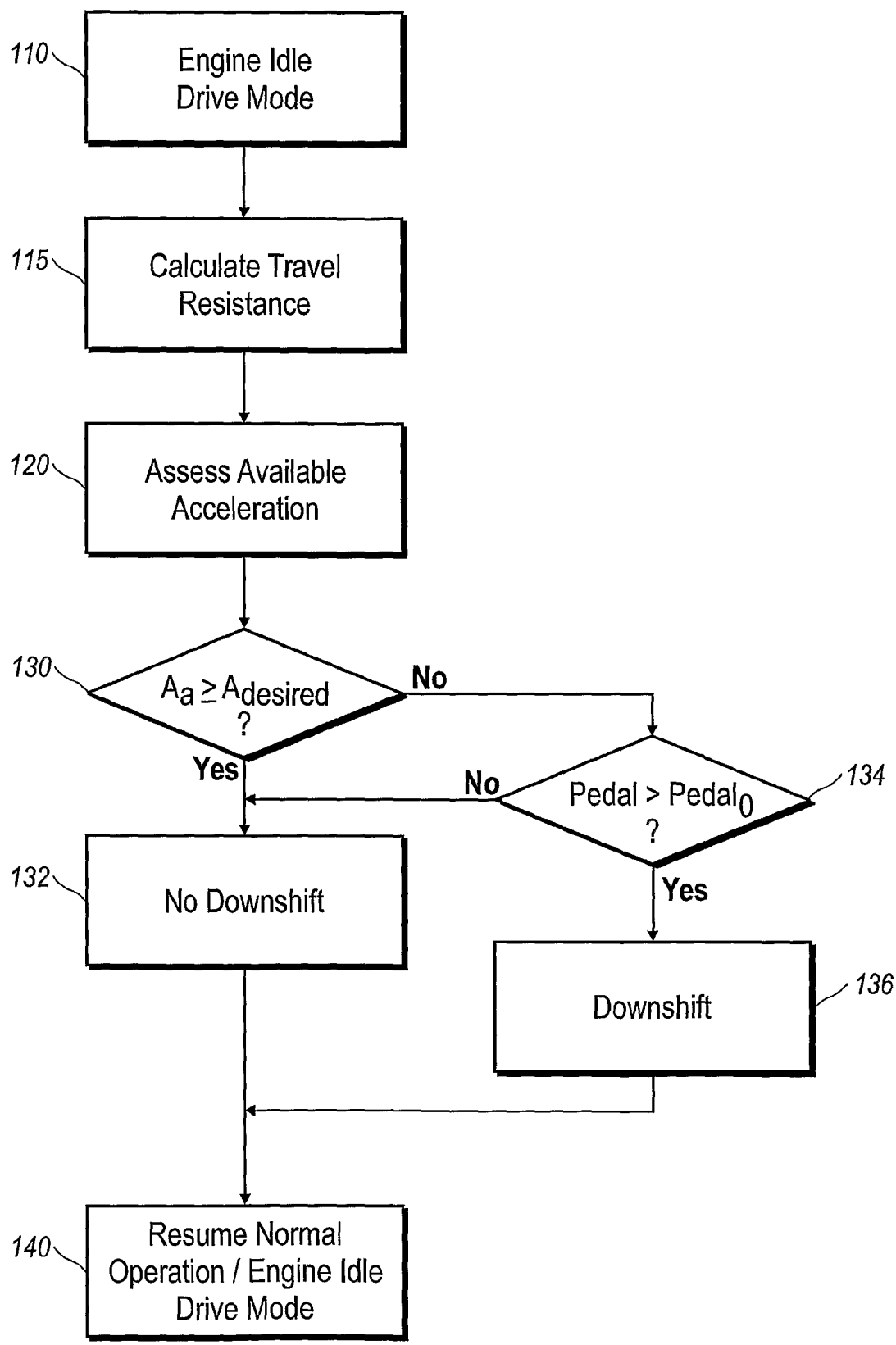
FIG. 2 is a flow chart showing a method according to another aspect of the present invention.

An exemplary method for exiting engine idle-driving mode as described above can be seen in simplified flowchart of FIG. 2. When the heavy vehicle is operating in an engine idle driving mode (block 110) and a request for acceleration is received by the system, the system determines whether the desired acceleration (Adesired) is less than the available acceleration ($A_a$) (block 130). This determination is based upon the assessment of available acceleration (block 120), which considers the vehicle's resistance to travel (block 115). If the available acceleration from the engine is capable of delivering the driver requested acceleration then no downshift is performed by the transmission (block 132). At that point the transmission is returned to a normal mode of operation (block 140) or it resumes the engine idle driving mode. Alternatively, if the determination is such that the driver's desired acceleration is less than the available acceleration from the vehicle's engine (block 130), then a second determination is made in respect to the pedal position (block 134). If the pedal is depressed greater than a predetermined amount (Pedalo) (block 134) then a downshift is performed (block 136). If the pedal depression does not exceed the predetermined amount (Pedalo) (block 134) then no downshift of the transmission is performed (block 132). When either the downshift or no downshift is performed the vehicle resumes either normal operation or resumes to engine idle drive mode (block 140).

What is claimed is:

1. A method for exiting an engine-idle driving mode in a heavy land vehicle having an automatic transmission, wherein said engine-idle driving mode is established in the vehicle when the engine is running substantially constantly at idle speed and a gear is engaged propelling the vehicle at a corresponding substantially constant, relatively slow vehicle speed, said method comprising:
    receiving a driver request, when in engine-idle driving mode, to accelerate from the prevailing substantially constant, relatively slow vehicle speed;
    assessing whether the engine torque requirement for delivering the requested acceleration can be developed from the engine while maintaining the automatic transmission in the same gear in which engine-idle driving is taking place; and
    delivering the requested acceleration by increasing the engine's torque output and without downshifting the automatic transmission.

2. The method as recited in claim 1, further comprising determining that sufficient torque can be developed by the engine while maintaining the prevailing gear to meet the driver request for acceleration and then delivering the requested acceleration by increasing the engine's torque output and without downshifting the automatic transmission.

3. The method as recited in claim 1, wherein the automatic transmission downshifts when in a normal driving mode and the same driver request is received to accelerate from the same relatively slow vehicle speed.

4. The method as recited in claim 1, wherein the driver request to accelerate the vehicle is assessed from the detection of a change in depression of an accelerator of the vehicle.

5. The method as recited in claim 4, wherein the change in depression of the accelerator is an increase in depression.

6. The method as recited in claim 5, wherein said increased depression of the accelerator initiates from a non-depressed position.

7. The method as recited in claim 1, further comprising:
    assessing, while in the engine-idle driving mode, whether available engine torque in the current gear is sufficient to maintain said substantially constant, relatively slow vehicle speed during times when vehicle travel resistance is fluctuating.

8. The method as recited in claim 7, further comprising:
    assessing said vehicle travel resistance at least in part based on mass of the vehicle.

9. The method as recited in claim 7, further comprising:
assessing said vehicle travel resistance at least in part based on presently existing road inclination.

10. The method as recited in claim 7, further comprising:
assessing said vehicle travel resistance at least in part based on presently existing, travel retarding wind resistance being experienced by the vehicle.

11. The method as recited in claim 7, further comprising:
assessing said vehicle travel resistance at least in part based on current engine torque and vehicle acceleration.

12. The method as recited in claim 7, further comprising:
downshifting said automatic transmission at least one gear when it is assessed that maximum available engine torque in the current gear is insufficient to meet the driver request for acceleration, when vehicle travel resistance is considered.

13. The method as recited in claim 7, further comprising:
downshifting said automatic transmission at least one gear when it is assessed that maximum available engine torque in the current gear does not meet a driver requested acceleration.

14. The method as recited in claim 7, wherein comparative assessment of available engine torque in the current gear and vehicle travel resistance is conducted substantially continuously.

15. The method as recited in claim 1, wherein comparative assessment of available engine torque in the current gear and driver requested acceleration is conducted substantially continuously while in the engine-idle driving mode.

16. The method as recited in claim 1, wherein said engine idle speed is approximately equal to 650 rpm.

17. The method as recited in claim 1, wherein said engine idle speed is essentially equal to 650 rpm, plus/minus 100 rpm.

* * * * *